US012601406B2

(12) United States Patent
Hvasta et al.

(10) Patent No.: US 12,601,406 B2
(45) Date of Patent: Apr. 14, 2026

(54) BRITTLE MATERIAL VALVES

(71) Applicant: Fourth Power, Inc., Cambridge, MA (US)

(72) Inventors: Mike Hvasta, Lawrence Township, NJ (US); Colin Kelsall, Cambridge, MA (US); Asegun Henry, Hyde Park, MA (US); Sandeep Pidaparti, Burlington, MA (US); Joe Patrinostro, Centerville, MA (US)

(73) Assignee: Fourth Power, Inc., Cambridge, MA (US)

( * ) Notice: Subject to any disclaimer, the term of this patent is extended or adjusted under 35 U.S.C. 154(b) by 97 days.

(21) Appl. No.: 18/419,043

(22) Filed: Jan. 22, 2024

(65) Prior Publication Data

US 2024/0247723 A1 Jul. 25, 2024

Related U.S. Application Data

(60) Provisional application No. 63/440,327, filed on Jan. 20, 2023.

(51) Int. Cl.
*F16K 27/02* (2006.01)
*F16K 1/32* (2006.01)
*F16K 25/00* (2006.01)

(52) U.S. Cl.
CPC .............. *F16K 1/32* (2013.01); *F16K 25/005* (2013.01); *F16K 27/02* (2013.01)

(58) Field of Classification Search
CPC ...... F16K 25/005; F16K 27/02; F16K 31/122; Y10T 137/6362
See application file for complete search history.

(56) References Cited

U.S. PATENT DOCUMENTS 2,336,694 A * 12/1943 Mattimore .............. F16K 27/04
285/179
3,606,242 A * 9/1971 Lathrop, II ........... F16K 3/0254
91/275

(Continued)

FOREIGN PATENT DOCUMENTS

CN 107321962 A * 11/2017 ............... B22C 9/02
DE 112005002871 T5 * 10/2007 ........... F16K 15/048

OTHER PUBLICATIONS

Machine translation DE 112005002871.*

(Continued)

*Primary Examiner* — Kevin F Murphy
(74) *Attorney, Agent, or Firm* — Polygon IP, LLP

(57) ABSTRACT

Some aspects of the disclosure provide a valve system that includes a valve made of brittle material, such as ceramic, graphite and the like. In some examples, the valve is made of one or more materials that remain a solid state in a temperature range of 1000° C. to 3000° C. The valve includes a valve housing with a cavity extending in a length direction of the valve. The valve housing includes a first port aligned with the cavity and a second port that is formed on a side of the cavity. The valve includes a plunger that is movable in the cavity of the valve housing and configured to control a fluid flow between the first port and the second port. Methods of forming the valve and operating the valve are also provided.

19 Claims, 6 Drawing Sheets

(56)  References Cited

U.S. PATENT DOCUMENTS

| | | | | |
|---|---|---|---|---|
| 4,292,991 | A * | 10/1981 | Wing ...................... | F16K 47/04 |
| | | | | 137/329.05 |
| 5,011,112 | A * | 4/1991 | Glamm .................. | F25B 41/35 |
| | | | | 251/129.05 |
| 5,092,362 | A | 3/1992 | Yie | |
| 5,381,818 | A | 1/1995 | Nendzig et al. | |
| 8,807,165 | B2 * | 8/2014 | Frank ...................... | F16K 25/04 |
| | | | | 137/599.05 |
| 9,816,626 | B1 * | 11/2017 | DeBlieck ............ | F16K 27/0263 |
| 10,344,559 | B2 * | 7/2019 | Zhao ........................ | E21B 34/10 |
| 10,533,097 | B2 * | 1/2020 | Lai ......................... | C09K 21/14 |
| 10,655,743 | B2 * | 5/2020 | Hagen ..................... | F16K 1/427 |
| 11,280,422 | B1 | 3/2022 | Brydon et al. | |
| 2007/0144585 | A1 | 6/2007 | Del Castillo Miro | |
| 2013/0334450 | A1 | 12/2013 | Proulx et al. | |
| 2018/0045197 | A1 | 2/2018 | Henry et al. | |
| 2018/0149279 | A1 | 5/2018 | Mann, III et al. | |
| 2019/0211944 | A1 | 7/2019 | Ismert | |

OTHER PUBLICATIONS

Machine translation CN 107321962.*

International Search Report and Written Opinion issued by the International Searching Authority in International Patent Application No. PCT/US24/12452, dated May 6, 2024.

* cited by examiner

TPV Can Be Retracted

200

290

295

210

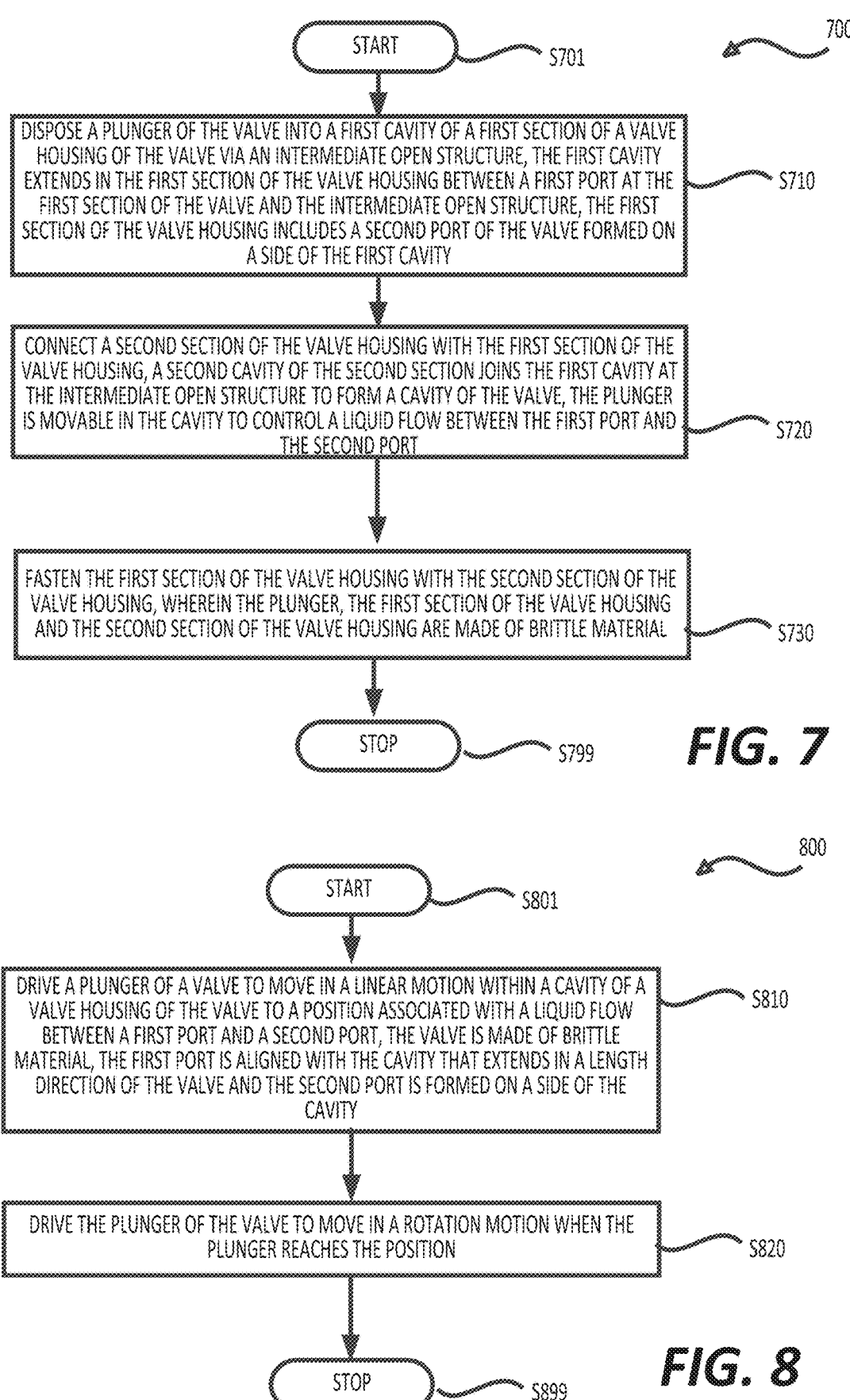

START — S701

DISPOSE A PLUNGER OF THE VALVE INTO A FIRST CAVITY OF A FIRST SECTION OF A VALVE HOUSING OF THE VALVE VIA AN INTERMEDIATE OPEN STRUCTURE, THE FIRST CAVITY EXTENDS IN THE FIRST SECTION OF THE VALVE HOUSING BETWEEN A FIRST PORT AT THE FIRST SECTION OF THE VALVE AND THE INTERMEDIATE OPEN STRUCTURE, THE FIRST SECTION OF THE VALVE HOUSING INCLUDES A SECOND PORT OF THE VALVE FORMED ON A SIDE OF THE FIRST CAVITY — S710

CONNECT A SECOND SECTION OF THE VALVE HOUSING WITH THE FIRST SECTION OF THE VALVE HOUSING, A SECOND CAVITY OF THE SECOND SECTION JOINS THE FIRST CAVITY AT THE INTERMEDIATE OPEN STRUCTURE TO FORM A CAVITY OF THE VALVE, THE PLUNGER IS MOVABLE IN THE CAVITY TO CONTROL A LIQUID FLOW BETWEEN THE FIRST PORT AND THE SECOND PORT — S720

FASTEN THE FIRST SECTION OF THE VALVE HOUSING WITH THE SECOND SECTION OF THE VALVE HOUSING, WHEREIN THE PLUNGER, THE FIRST SECTION OF THE VALVE HOUSING AND THE SECOND SECTION OF THE VALVE HOUSING ARE MADE OF BRITTLE MATERIAL — S730

STOP — S799

START — S801

DRIVE A PLUNGER OF A VALVE TO MOVE IN A LINEAR MOTION WITHIN A CAVITY OF A VALVE HOUSING OF THE VALVE TO A POSITION ASSOCIATED WITH A LIQUID FLOW BETWEEN A FIRST PORT AND A SECOND PORT, THE VALVE IS MADE OF BRITTLE MATERIAL, THE FIRST PORT IS ALIGNED WITH THE CAVITY THAT EXTENDS IN A LENGTH DIRECTION OF THE VALVE AND THE SECOND PORT IS FORMED ON A SIDE OF THE CAVITY — S810

DRIVE THE PLUNGER OF THE VALVE TO MOVE IN A ROTATION MOTION WHEN THE PLUNGER REACHES THE POSITION — S820

STOP — S899

BRITTLE MATERIAL VALVES

INCORPORATION BY REFERENCE

The present application claims the benefit of priority to U.S. Provisional Application No. 63/440,327, "BRITTLE MATERIAL VALVES" filed on Jan. 20, 2023, which is incorporated by reference herein in its entirety.

TECHNICAL FIELD

The present disclosure describes technologies generally related to fluid or thermofluid handling systems. In some examples, a thermofluid handling system may include an energy storage system, such as the thermal energy storage system briefly described herein, that is termed thermal batteries. The technologies described in the present disclosure may be used to manage fluid flow, for the purpose of its reduction or redirection along a particular flow path.

BACKGROUND

Most flowing fluid or solid material handling systems are constructed from standard engineering construction materials, such as concrete or cement, polymers such as polyvinyl chloride (PVC), or ductile metals such as aluminum alloys, magnesium alloys, iron alloys, titanium alloys and nickel alloys. However, these materials have important limitations, namely they are limited to extended use at temperatures below ~1000° C. There are nonetheless other applications where it is desirable to operate material handling systems above 1000° C., or in corrosive environments where the aforementioned materials or their derivatives or composites are unsuitable. One such case is an energy storage system, herein termed thermal batteries, that requires a sealed fluid handling infrastructure for liquid tin, that has a nominal operating temperature range of 1900° C.-2400° C. For this application, it may be convenient to use a piping system made of high temperature materials, such as carbon (or graphite) or ceramics. For normal thermofluid handling infrastructures, the ductile nature of the piping network may be relied upon to absorb the growth/shrinkage during thermal cycles. For example, expansion joints, which may be U-shaped sections of the piping network, that may be intentionally added so that when long sections of the piping system (or piping network) expand/contract, the expansion joints may simply mechanically deflect, bend or stretch, in a reversible way that does no lead to fracture. The deflection may be designed to stay well within a safe operating regime of the material so that mechanical failure may be prevented. However, for brittle materials (e.g., graphite), such an approach may lead to pipe fracture or component rupture, or mechanical failure, since the brittle materials do not bend, stretch or yield much before fracture.

SUMMARY

Aspects of the disclosure include methods and apparatuses relating to brittle material valves, for example.

Some aspects of the disclosure provide a valve system that includes a valve made of or comprising brittle material, such as ceramic, graphite, and the like. In some examples, the valve is made of one or more materials that remain a solid state in a temperature range of 1000° C. to 3000° C. The valve may include a valve housing having a cavity extending in a length direction of the valve. The valve housing may include a first port aligned with the cavity and a second port that is formed or otherwise located on a side of the cavity. The valve may include a plunger that is movable in the cavity of the valve housing and may be configured to selectively control a fluid (e.g., a liquid) flow between the first port and the second port.

In some examples, a valve includes a valve housing having a direction of extension of the valve housing and a valve cavity extending therein. The valve cavity extends in the direction of extension of the valve housing, the valve cavity has a diameter of opening perpendicular to the direction of extension of the valve housing. The valve housing includes a first port of the valve housing having a first port opening extending therein in a first port direction of extension. The first port direction of extension is parallel with the direction of extension of the valve housing, the first port opening communicates with the valve cavity. The valve housing includes a second port of the valve housing having a second port opening extending in a second port direction of extension, the second port direction of extension is perpendicular to the direction of extension of the valve housing, the second port opening communicates with the valve cavity. The valve includes a plunger that is movably retained within the valve cavity so as to selectively control a fluid flow among the valve, the first port, and the second port.

In some examples, the plunger may be configured to have a linear direction of motion and/or a rotational direction motion in the cavity. In an example, the plunger is configured to have rotational motion when the linear motion stops. In an example, the plunger is configured to rotate a predefined angular distance.

In some examples, a head surface of the plunger may be configured to form a sealing structure that partially or fully closes a flow path for a fluid flow between the first port and the second port contemporaneously with movement of the plunger causes the head surface of the plunger to contact a portion (e.g., interior portion) of the first port. In an example, the head surface of the plunger may be configured to include a mating surface cooperatively engageable with the interior portion of the first port. In an example, the plunger may include a groove located on the head surface of the plunger, and a compressible sealing material is installed or otherwise locatable so as to cover the groove.

In some examples, the plunger may include a groove located on a side surface of the plunger, and a compressible sealing material may be installed or otherwise locatable so as to cover the groove. In such cases the compressible sealing material could be made from carbon or graphite, such as a flexible graphite gasket material, a flexible graphite packing material, a flexible graphite ferrule, O-ring or other related option. It could also be made from a deformable metal or alternative material.

In some examples, the valve housing may include a first section and a second section that are configured to be engageable in the length direction with at least a compressible sealing material located therebetween.

In some examples, the valve system may include an actuator that is coupled to the plunger via a connection structure and is configured to drive the plunger to move at least partially within the cavity, the actuator including at least some material that is different from the material comprised in the valve.

In some examples, the actuator may include an oil based pneumatic cylinder configured to drive the plunger in a linear direction therewithin. It could also include electromechanical actuation or otherwise.

In some examples, the actuator may comprise a rotation structure configured to drive the plunger in a rotational motion.

In some examples, the actuator may comprise a coupling structure configured to selectively decouple the rotation structure from a shaft for driving the plunger in the linear motion.

Some aspects of the disclosure relate to a method or methods of assembling a valve. The method may include disposing a plunger of the valve into a first cavity of a first section of a valve housing of the valve via an intermediate open structure. The first cavity may extend within the first section of the valve housing from a first port located in the first section of the valve to the intermediate open structure, the first section of the valve housing including a second port for the valve, located on a side of the first cavity. The method may also include connecting a second section of the valve housing with the first section of the valve housing. A second cavity of the second section may be joined to the first cavity at the intermediate open structure to form a cavity of the valve, for example, such that the plunger is selectively movable in the cavity to control a fluid flow between the first port and the second port. The method may also include fastening or otherwise fixably positioning the first section of the valve housing relative to the second section of the valve housing. The plunger, the first section of the valve housing, and the second section of the valve housing may be made of a brittle material, such as ceramics, graphite and the like. In some examples, the plunger, the first section of the valve housing, and the second section of the valve housing may be made of one or more materials that remain a solid state in a temperature range of 1000° C. to 3000° C.

In some examples, the method may include installing a compressible sealing material so as to cover a groove at a head surface of the plunger before disposing the plunger relative to a receiving opening, such as the cavity.

In some examples, the method may include installing a compressible sealing material so as to cover a groove in a side surface of the plunger. It may also include features that prevent the compressible material from loosening or becoming dislodged when the plunger is retracted. This can be important to ensure that the valve can successfully form and break a seal many times without damaging the compressible material.

In some examples, the method may include disposing a compressible sealing material between the first section of the valve housing and the second section of the valve housing.

Some aspects of the disclosure provide a method of valve operation. The method may include driving a plunger of a valve with a linear directional motion within a cavity of a valve housing of the valve from a first position to a position associated with a fluid flow between a first port and a second port. The valve may be made or include of brittle material, such as ceramics, graphite and the like. In some examples, the valve may be made of one or more materials that remain a solid state in a temperature range of 1000° C. to 3000° C. The first port may be aligned with a cavity that extends in a length direction of the valve, and the second port may be formed on a side of the cavity. The method may also include driving the plunger of the valve so as to move the plunger in a rotational motion when the plunger reaches a selected position. In an example, the method may include driving the plunger in a manner such that a selected angular distance of the rotational motion occurs. In some examples, the method may include driving the plunger via an oil based pneumatic cylinder, or electromechanical actuation to produce the linear motion.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

Further features, the nature, and various advantages of the disclosed subject matter will be more apparent from the following detailed description and the accompanying drawings in which:

FIG. 7 shows a flow chart outlining a process to form a valve in accordance with some example implementations.

FIG. 8 shows a flow chart outlining a process to operate a valve in accordance with some example implementations.

DETAILED DESCRIPTION

Thermal batteries may be grid scale rechargeable batteries that are intended to store electricity from renewables and enable greater penetration of renewable energy onto the grid. Thermal batteries may operate by taking electricity from the grid, from any source, converting the electricity to extremely high-temperature sensible heat (e.g., 1900-2400° C.), and then storing the thermal energy in thermally well-insulated facilities until the energy is dispatched, either as electricity or heat. When needed, the stored thermal energy may be converted back to electricity via thermophotovoltaics (TPV). Thermal batteries may be thermally-insulated and held inside an inert environment, such as an argon (Ar)-filled environment, using well-established controlled atmosphere (CA) technology, such as the one used in the long-term fruit storage industry. The inert environment may prevent oxidation of high-temperature materials used in the thermal batteries and allow the energy storage system to have an expected lifetime of 30 years or more. Furthermore, it can be used as fire suppression, or for fire/tamper prevention. Aspects of the thermal batteries disclosed herein include that the power and energy may be decoupled, such that the thermal batteries may be sized to have a 1 hr, a 10 hr, or a greater than 100 hr discharge (or any duration in between approximately 1-1000 hrs). In an aspect, the energy storage system of the thermal batteries may be built based on carbon and tin (Sn). Sn may be used as a heat transfer fluid because Sn does not chemically interact with the carbon at any temperature. Thus, corrosion may be prevented and the materials (e.g., Sn and carbon) of the energy storage system may remain in thermodynamic equilibrium with each other. Sn may be used because Sn has a low melting point (e.g., 232° C.), a high boiling point (e.g., 2602° C.), and weak oxidation. Thus, Sn may not pose a fire or explosion hazard like alkali metals that have been extensively researched for nuclear applications. Furthermore, Sn is affordable, as Sn is much less expensive than similar metals like gallium and is available in large quantities as Sn is the primary component of solders.

Figure 1:
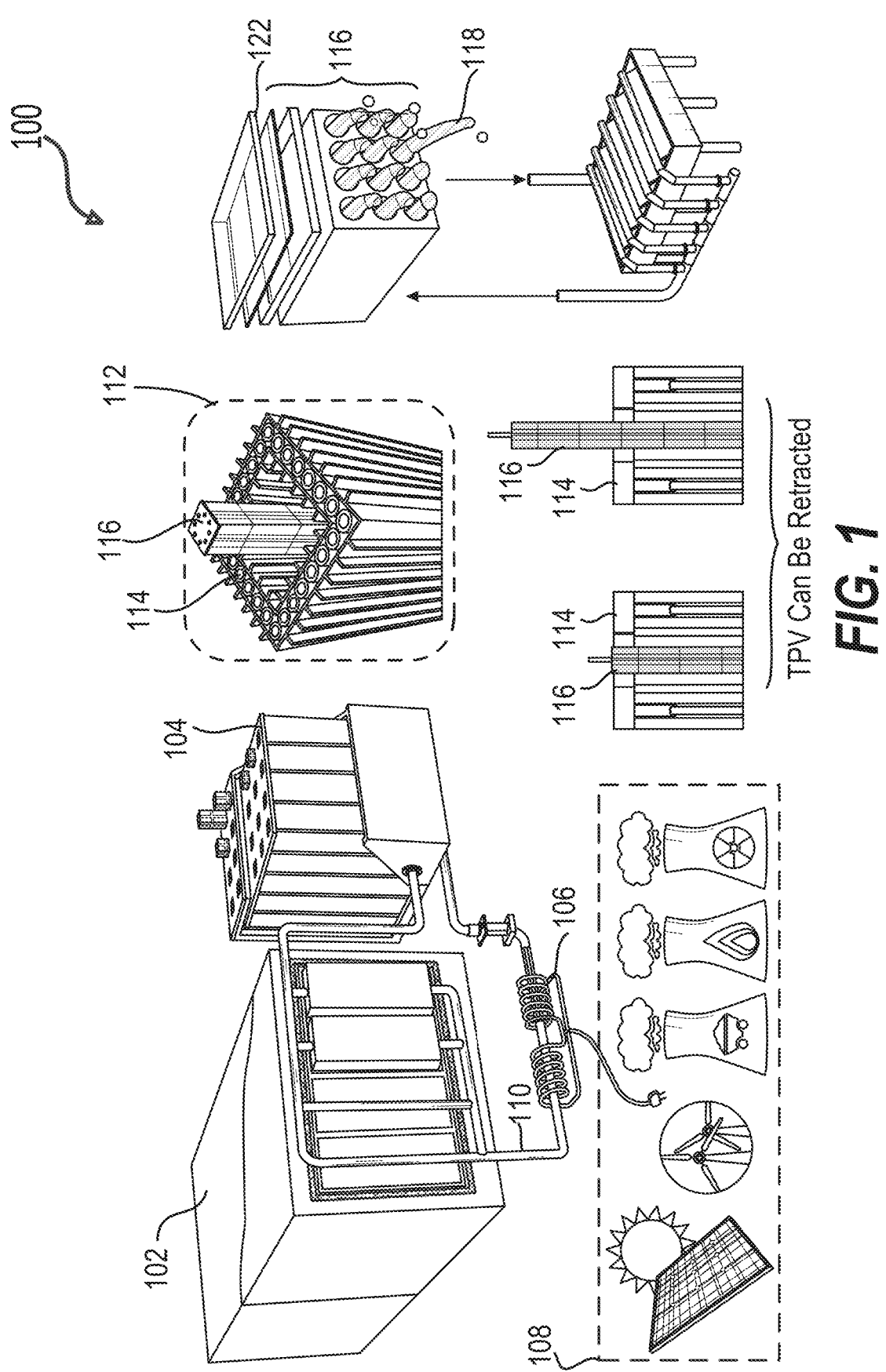
FIG. 1 shows an example diagram of a thermal battery system in accordance with some embodiments.

FIG. 1 shows an example thermal battery system (interchangeably referred to herein as a thermal battery) 100. As shown in FIG. 1, the system 100 may include a storage unit 102 that may include a plurality of graphite blocks. The storage unit 102 may have a large size, such as 30 m×15 m×10 m. Each of the plurality of graphite blocks may have a nominal dimension, such as 0.6 m×0.6 m×2 m. The storage unit 102 may be configured to store thermal energy. The system 100 may include a power block 104. The power block 104 may include an array of thermophotovoltaics (TPV) unit cell structures (interchangeably referred to herein as TPV cells) 112. Each TPV cell 112 may work in a same way as normal solar photovoltaics (PV), via the photoelectric effect, to convert light (interchangeably referred to herein as photons) into electricity. Each of the TPV cells 112 may include an array of pipes 114 and a TPV device 116. As shown in FIG. 1, the TPV device 116 may further include a mirror 122 configured to reflect the light radiated from the pipes 114. The TPV device 116 may be cooled down by a liquid coolant 118, such as water. In an aspect, the TPV device 116 may be retracted (or removed) from the array of the pipes 114. The system 100 may further include a piping infrastructure 110 in which a liquid metal (e.g., Sn) may flow between the storage unit 102 and the power block 104 for heat transfer. The system 100 may include heating elements 106 that may be configured to heat up the liquid metal in the piping infrastructure 110.

An example operation of the system (or thermal battery) 100 may include charging, energy storage, and discharging. In the charging step, the system 100 may be charged with electricity from any source, such as the electrical source 108. In an aspect, the system 100 may be expected to operate using intermittent renewable energy, such as solar energy and wind energy that are shown in the electrical source 108. The heating elements 106 within the system 100 may radiatively transfer energy to the graphite piping infrastructure 110. The piping infrastructure 110 may contain liquid Sn, which may be mechanically pumped through pipes of the piping infrastructure 110 when the Sn may be heated nominally from 1900° C. to a peak temperature of ~2400° C. Once heated, the Sn may be pumped through the graphite blocks of the storage unit 102. The Sn flowing through the graphite pipes of the piping infrastructure 110 may radiatively transfer thermal energy to the graphite blocks of the storage unit 102. Once the Sn passes through the storage unit 102, Sn may be rerouted back to the heating elements 106 to be reheated to approximately 2400° C., thereby enabling continuous charging of the thermal battery system 100. When the large bank of graphite blocks in the storage unit 102 may be fully heated, the thermal battery system 100 may be considered as fully charged.

In the energy storage step, given the large size of the storage unit 102 and the fact that the storage unit 102 may be thermally insulated from an outer inert containment and environment, the heat (interchangeably referred to herein as thermal energy) in the graphite blocks of the storage unit 102 may be kept (or stored) for a period of 1 month or more, losing less than 1-5% of the energy stored each day, for example.

In the discharging step, when electricity is needed, the thermal battery system 100 may discharge by pumping the liquid metal (e.g., Sn) through the storage unit 102 towards the power block 104, which contains the array of TPV unit cell structures (or TPV cells) 112. The liquid metal (e.g., Sn)

may be pumped through a parallel array of pipes 114 that then radiate light to the TPV devices 116. In an aspect, the radiated light may be a terrestrial heat source that may have a spectral peak in an infrared regime. The TPV cells 112 may convert the light emitted by the piping network (interchangeably referred to herein as an array of pipes) 114, which may be glowing white hot, back to electricity. The TPV cells 112 may be efficient since the TPV cells 112 may be designed to convert high frequency light, which may be converted most efficiently. The rest of the light may pass through the TPV cells 112 because the rest of the light may be transparent to the TPV cells 112. The rest of the light may be reflected from a gold or silver mirror 122 at the back of the TPV device 116, for example. When reflected off the mirror 122, the light may be reabsorbed by the hot infrastructure (e.g., the pipes 114) and preserved, enabling a high roundtrip efficiency (RTE) of ~50%, for example. As the liquid metal (e.g., Sn) passes through the power block 104, some of the thermal energy of the liquid metal may be converted to electricity. Accordingly, the Sn may cool back to nominally ~1900° C., for example. The Sn may recirculate through the storage unit 102 to be reheated to 2400° C. In this way, the thermal battery system 100 may be continuously discharged to meet a grid demand.

In an example implementation, the nominal operating point for the thermal battery system 100 to store heat in the graphite blocks of the power block 104 may be between about 1900° C. and 2400° C. To reach the nominal operating temperature range of 1900° C.-2400° C., a piping system made of high temperature resistant materials, such as carbon (or graphite), may be used. Graphite is a crystalline form of the element carbon, and graphite consists of stacked layers of graphene. Graphite may be soft and flexible, when the layers of covalently bonded carbon atoms are organized with coplanar orientation. On the other hand, graphite can be brittle when the layers form individual grains that are disordered in their orientation, yet interconnected to form a monolithic material. This arises from the fact that the carbon atoms are bonded by only three strong covalent bonds in a two-dimensional layer in the plane, while they are weakly bonded with van der Waals interactions in the perpendicular direction. Individual layers may be very strong, but the layers may be shifted easily relative to each other.

According to an aspect of the disclosure, in order to realize the thermal battery system 100 shown in FIG. 1, various valves, such as stop valves and flow diverter valves, may be used to provide various advantages. In an example, valves may be used to facilitate drainage of the entire thermal battery system for maintenance. In another example, valves may be used to dynamically change the way the thermal battery system 100 operates, such as by enabling the fluid to be operated in reverse, draining only a section of the thermal battery system 100, and the like. According to an aspect of the disclosure, for use of valves in the thermal battery system 100, the valves may need to operate in a temperature range of about 1900° C.-2400° C., and it therefore may be useful to have such valves to be made from or include ceramics or graphite. In some examples, it may be useful for such valves that make use of flexible graphite sealing (e.g., GraFoil® material), so that some or all of the materials of construction may readily operate in the target temperature range (1900° C.-2400° C.), without significant chemical or other degradation. It is noted that ceramics and graphite are brittle materials that may fracture when subjected to stress but that may have little tendency to deform before rupture. Brittle materials are characterized by the nature of the way they fracture. Unlike ductile materials, which elastically deform and eventually yield and plastically deform, brittle materials exhibit little deformation, followed by immediate fracture. As a result, brittle materials tend to have low fracture toughness, exemplified by a poor capacity to resist catastrophic failure from microcracks or flaws.

Some aspects of the disclosure provide techniques to implement brittle material valves and valve systems to allow the brittle material valves to operate in such high temperature ranges with relatively good performance and relatively less likelihood of damage during operation.

Figure 2:
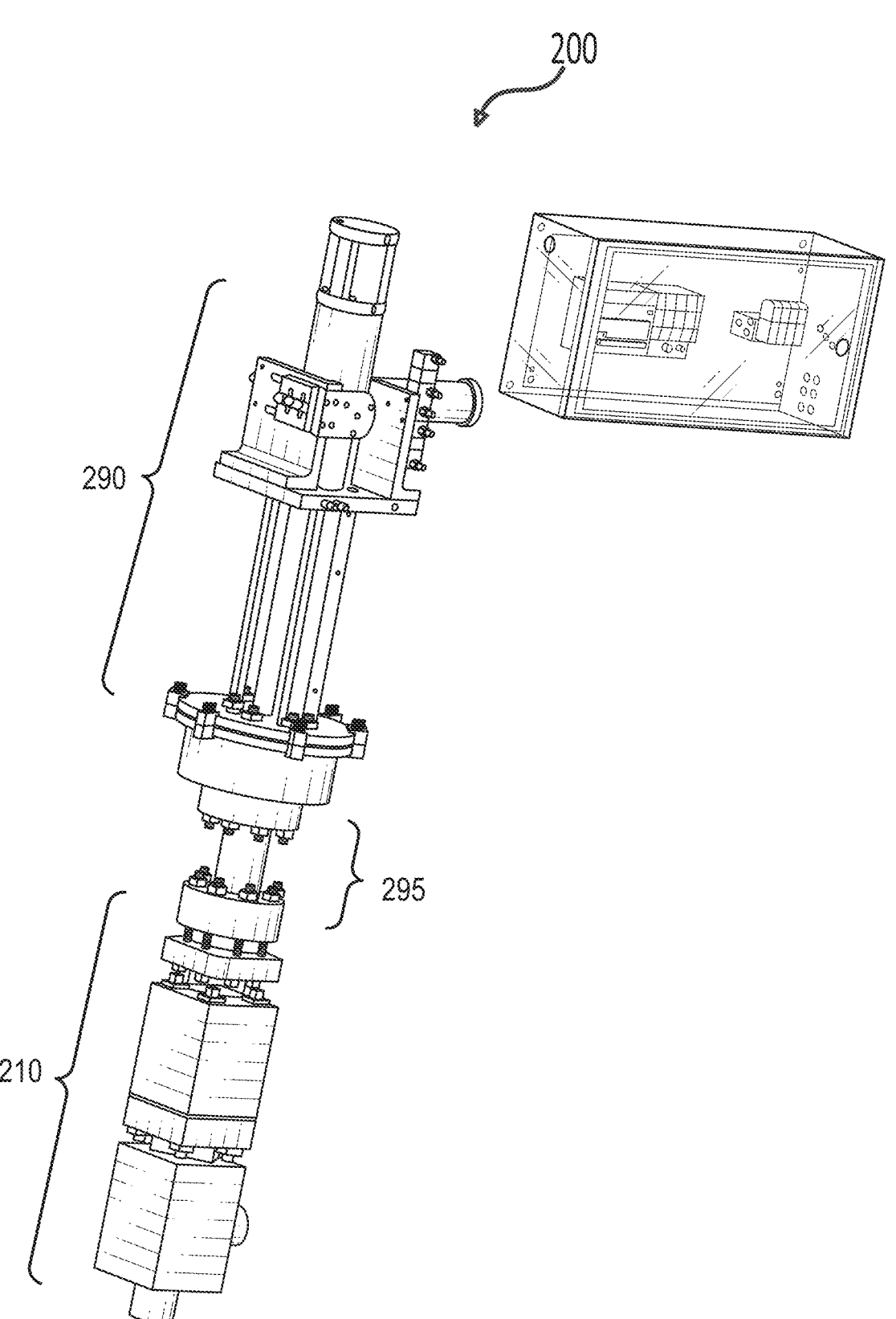
FIG. 2 shows a diagram of a valve system usable in accordance with some example implementations.

FIG. 2 shows a diagram of an example valve system 200 usable in accordance with aspects of the present disclosure. The valve system 200 may include a valve 210, an actuator 290 and a connection portion 295 (also interchangeably referred to herein as "connection structure") that may couple the valve 210 and the actuator 290 to one another.

According to an aspect of the disclosure, the valve 210 may be configured to operate in a high temperature zone, such as in the temperature range of 1900° C.-2400° C., and thus the valve 210 may beneficially be made of or comprise material that is able to withstand high temperature. While the following description uses graphite as an example, the valve 210 may be made of or comprise other suitable material(s), such as ceramics (e.g., silicon carbide, alumina, zirconia, magnesia, silicon nitride as well as various other carbides, borides, nitrides and oxides), and the like. In some examples, the actuator 290 may be configured to operate in a relative low temperature zone, such as much lower than 1900° C., and may be made of or comprise suitable material that may not be brittle, such as stainless steel, and the like. In some examples, the connection portion 295 may also be made of or comprise material that may be able to withstand the high temperature.

In some examples, the valve 210 may be made of or comprise graphite. For example, the valve 210 is made of high-density graphite, such as isostatically pressed grades of graphite with mean particle sizes less than 200 micron. The high-density graphite may hold the liquid tin (Sn) at a pressure and temperature suitable for use in a thermal battery system, such as the pressure and temperature that the thermal battery system 100 operates. The high-density graphite may avoid liquid tin penetration through pores of the graphite.

Figure 3:
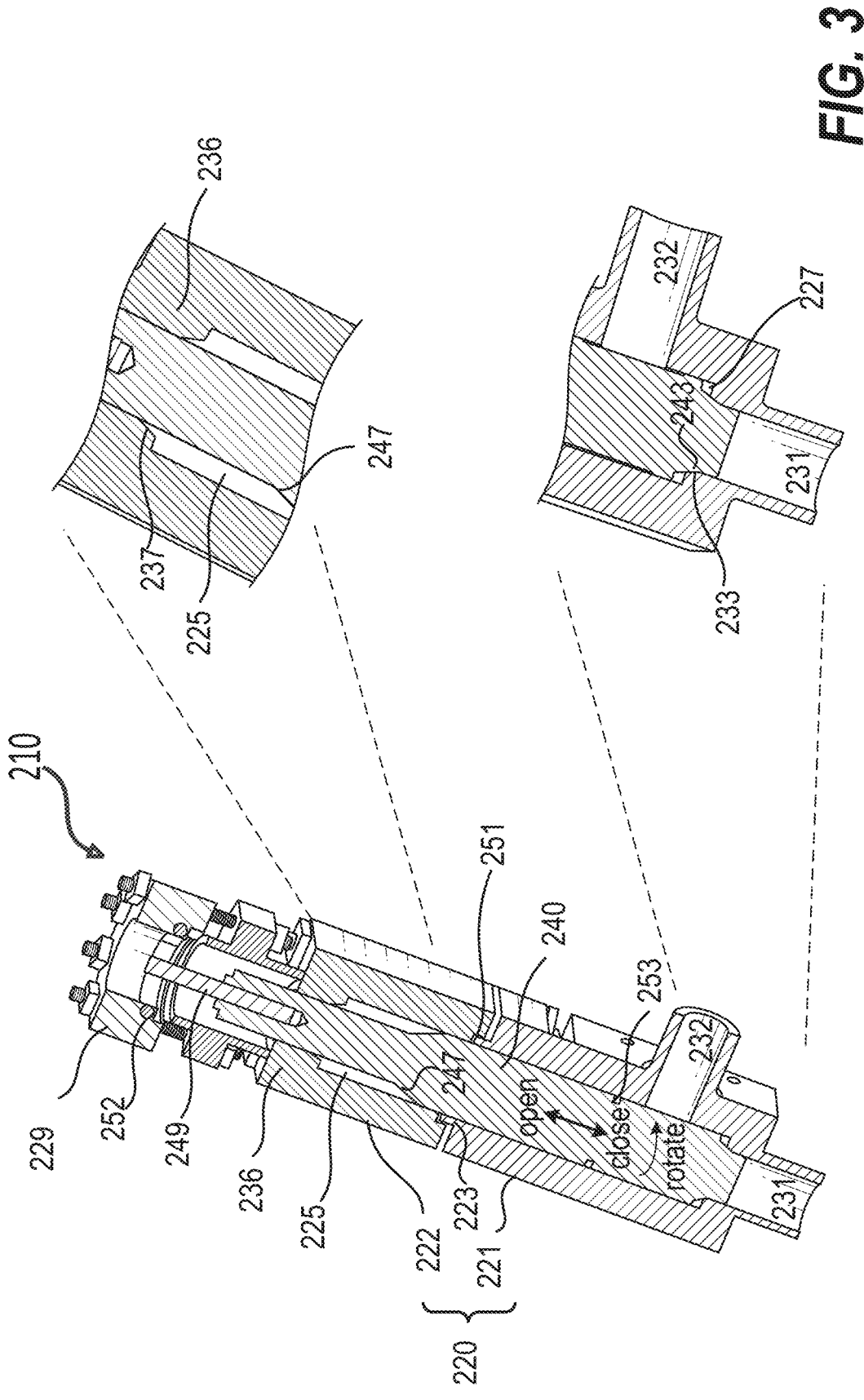
FIG. 3 shows a cross-sectional view of a valve in accordance with some example implementations.
Figure 4:
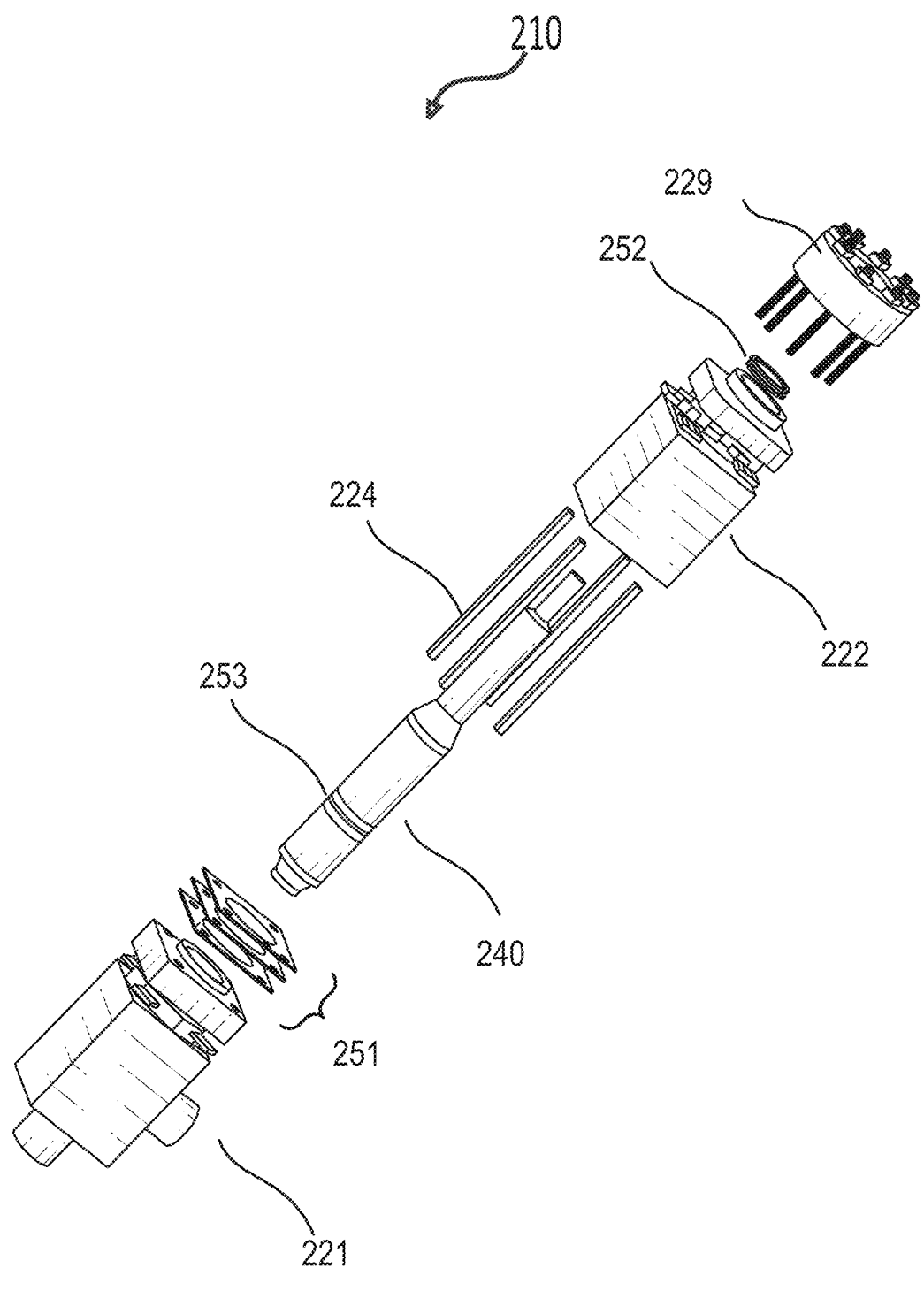
FIG. 4 shows an exploded view of a valve in accordance with some example implementations.

FIG. 3 shows a cross-sectional and close up views of selected portions of the example valve 210 of FIG. 2; FIG. 4 shows an exploded view of various portions of the valve 210 of FIG. 3, in accordance with some example implementations. The valve 210 shown in FIG. 3 includes a housing 220 with a cavity 225 located therein, and a plunger 240 that is movable within the cavity. In some examples, the housing 220 may include a first section 221 and a second section 222 that are assemble with one another. The housing 220 may define a cavity 225 that extends in a longitudinal direction within the valve 210, and the plunger 240 may be configured to move in the longitudinal direction of the valve 210 to control a fluid flow that passes the valve 210. In some examples, the fluid flow includes liquid tin. The first section 221 may include two ports, such as a first port 231, which is also interchangeably referred to herein as an inlet, and a second port 232, which is also interchangeably referred to herein as an outlet in some examples. The cavity 225 may be aligned with one of the two ports, such as the inlet 231, and may extend perpendicularly to the other of the two ports, such as the outlet 232 in an example. It should also be noted that many other port arrangements and configurations are possible as well.

According to an aspect of the disclosure, the plunger 240 may be selectively driven to move in the longitudinal direction to partially or fully open or close the valve 210, for example, and thus to control the fluid flow. As shown in FIG. 3, the plunger 240 may move towards the inlet 231 to a position that may for example, be able to completely block flow via the outlet 232 and/or the inlet 231. Thus, for example, when the valve 210 is in a closed position, there may be no communicating flow path between the inlet 231 and the outlet 232, and the fluid flow may be prevented from communicating through the valve 210 (e.g., zero fluid flow), as shown in FIG. 3. Further, though not shown in FIG. 3, the plunger 240 may move distally from the inlet 231, such as to a position such that flow may communicate through inlet 231 and/or the outlet 232. Thus, when the valve 210 is in an open position, for example, a flow path may extend from the inlet 231 to the outlet 232, and fluid may flow through valve 210. It is noted that, in some example implementations, the plunger 240 may be moved to a position that may completely unblock the inlet 231 and partially block the outlet 232. Thus, the valve 210 in this position may be partially open, with a flow path extending from the inlet 231 to the outlet 232; however, the flow capacity of the valve 210 in this position of being partially open may be lower than the flow capacity when the valve is in positions such that both inlet 231 and outlet 232 are completely open. In some examples, the plunger 240 may be driven to any suitable position that corresponds to a preferred flow rate via the inlet 231 and outlet 232.

In some examples, the interior surface of the inlet 231, and the head of the plunger 240 may be configured to have mating portions (e.g., mating surfaces) to form a mating seal when the plunger 240 moves to a position such that the head of the plunger 240 contacts the interior surface of the inlet 231. The mating seal may thereby prevent fluid flow (e.g., zero fluid flow), such as flow of liquid tin, when the valve 210 is closed. In the lower portion close-up of the example implementation of FIG. 3, a portion 233 of the interior surface of the inlet 231 and a portion 243 of exterior surface of the head of the plunger 240 are shown as having correspondingly tapered mating portions, in order to sealably close or reduce flow via inlet 231, for example.

Further, as also shown in the example of the lower portion close-up of FIG. 3, the interior surface of the inlet 231, and the head of the plunger 240 may be configured to have non-mating portions shaped and sized such that a small portion of the cavity 225 may remain unblocked when the mating portions 233, 243 are matingly engaged with each other. For example, FIG. 3 shows a small cavity 227 when the portion 233 of the interior surface of the inlet 231 and the portion 243 of the head of the plunger 240 are in contact with one another. It is noted that when the plunger 240 moves towards the inlet 231 to close the valve 210, the small cavity 227 may thereby retain a small amount of fluid to prevent the plunger 240 from destructively impacting the housing portion 221 of the valve 210 (e.g., the retained fluid compressively dampening the force of closing thereby reducing the likelihood of damage to the brittle material of the valve 210) on the interior surface of the inlet 231. Thus, the plunger 240 may have a soft cushioned engagement with the inlet 231 to form the mating seal in some examples.

Further, according to an aspect of the disclosure, the plunger 240 may be configured to angularly rotate, such as near the end of a closing of the valve 210, for example at or near the point that the mating portions 233 and 243 contact one other. In one example implementation, the plunger 240 may controlled to angularly rotate about 5° to 15° toward the end of a closing of the valve 210. In the absence of such feature, over time, scratched or uneven wear may occur for the mating portions 233 and 243, and the use of angular rotation of the plunger 240 at or near closing may assist the mating portions to hone the contacting portions and thereby maintain better sealing. It is noted that the plunger 240 may be configured to turn any suitable angle, or turn in any suitable direction (e.g., clockwise counterclockwise and the like).

It is noted that similar features and functionality to minimize damage to the plunger 240 and/or the housing 221 may be applied with respect to the tail of the plunger 240 (i.e., the tail being the end of the plunger 240 opposite to the end of the plunger 240 shown in the lower closeup portion of FIG. 3) via similar features for the back open structure of the second section 222. In the upper closeup portion of FIG. 3, for example, the second section 222 includes a back open structure 236 that is located at an opposite end of the cavity 225 from the first port 231. The interior surface of the back open structure 236 and the tail of the plunger 240 may be configured to have mating portions to form a mating seal when the plunger 240 is operated so as to open the valve 210 and allow the tail of the plunger 240 (e.g., near point labeled 247) to contact the interior surface (e.g., near point labeled 237 of the back open structure 236. The mating seal may prevent fluid, such as liquid tin to leak past the end opening structure 236 of the second housing section 222.

Similarly, according to an aspect of the disclosure, the plunger 240 may be configured to angularly rotate at the end of an opening of the valve 210, for example, when the mating portions 237 and 247 contact one another. For example, the plunger 240 may be controlled so as to angularly rotate about 5° to 15° at the end of an opening of the valve 210. In this example, over time, scratched or uneven wear due to one of the mating portions 237 and 247, via the rotation of the plunger 240 may assist in honing each other's surfaces and maintaining sealing surfaces. It is noted that the plunger 240 may be configured to angularly rotate at any suitable angle, or turn in any suitable direction (e.g., clockwise counterclockwise and the like).

In some examples, seals may be formed or located at a number of suitable portions of the valve 210. In the FIG. 3 example, a seal 251 may be located between the first section 221 and the second section 222 of the housing 220, and the seal 251 may be compressible. Further, a secondary seal 252 may be located near the open structure 236 of the second section 222. The seal 251 and secondary seal 252 may be made of or include graphite and may have any suitable form, such as packing ropes, ferrules, gaskets and the like. It is noted that such seals may be formed at other suitable portions of the valve 210, such as at the inlet 231 and the like.

In some examples, a wiper 253 may be located or formed on the surface of the plunger 240. In an example implementation, a groove may be formed on the outer surface of the plunger 240, and graphite in the form of a packing rope, for example, may be inserted within the groove to form the wiper 253. The wiper 253 may move with the plunger 240 and clean the cavity 225 of the housing 220, among other functions. In one example implementation, the wiper 253 may also function as a semi-seal that is not very tight so as to reduce friction between the plunger 240 and the housing portions 221, 222.

Figure 5:
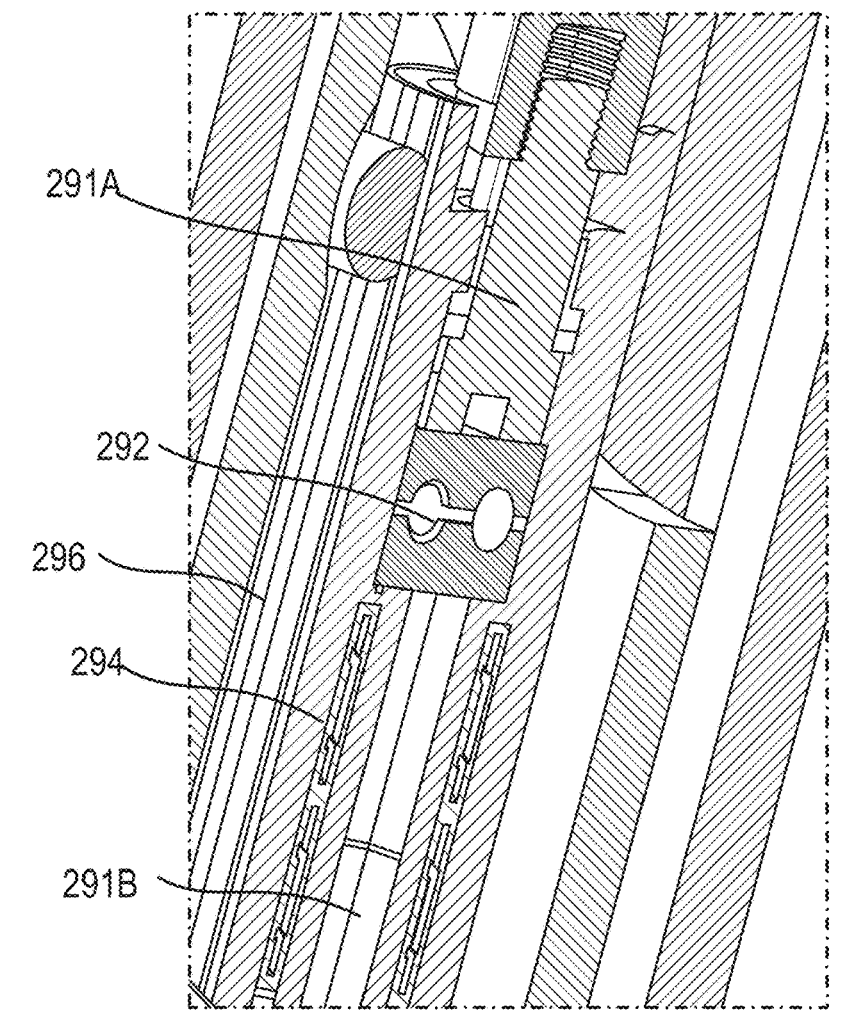
FIG. 5 shows a cross-sectional view of a portion of an actuator in accordance with some example implementations.

FIG. 5 shows a cross-sectional view of a portion of the actuator 290 of FIG. 2, usable in some example implementations. The actuator 290 of this example includes a shaft 291 (e.g., including 291A and 291B shown in FIG. 5) that is suitably coupled to the plunger 240 of FIG. 3 (e.g., via a shaft 249 of the plunger 240 shown in FIG. 3) to drive the plunger 240 (FIG. 3) to move in the linear motion along the longitudinal direction of the plunger 240 and to drive the plunger 240 to move in the rotation motion. In some example implementations, per FIG. 3, the actuator 290 may control motion of the plunger 240 via the shaft 291 to move and stop at any suitable position in the longitudinal direction to control the flow capacity between the two ports 231 and the 232 (see FIG. 3). For example, the actuator 290 may move the plunger 240 to a first position for a fully close of the valve 210, may move the plunger 240 to a second position for a partial open of the valve 210, and may move the plunger 240 to a third position for a fully open of the valve 210.

In some examples, the actuator 290 may include an oil based pneumatic cylinder (not shown in FIG. 5) that uses oil over argon to actuate. The oil based pneumatic cylinder may have a similar structure to an air cylinder and operate similarly. In the oil based pneumatic cylinder, oil may be used in the place of air, so that the actuator 290 may drive the plunger 240 more smoothly (in absence of air compression effects, for example). In some example implementations, sensors may be installed to detect the positions of the shaft coupled to the plunger 240, and a controller may control the oil based pneumatic cylinder based on the information provided by the sensors. The actuator 290 may thereby drive the plunger 240 to move to any suitable position. It is noted that the oil based pneumatic cylinder may have any suitable design.

Further, in some example implementations, the actuator 290 may include a rotation structure or rotation mechanism. In the FIG. 5 implementation, for example, the shaft 291 includes a first portion 291A and a second portion 291B. The second portion 291B is coupled to the shaft 249 (FIG. 3) of the plunger 240 (FIG. 3). As shown in FIG. 5, the first portion 291A and the second portion 291B are coupled via a coupling structure 292. The coupling structure 292 may couple the first portion 291A and the second portion 291B together, in a manner such that the oil based pneumatic cylinder (not shown) may apply force on the first portion 291A to drive the plunger 240 (FIG. 3) to move linearly. Further, the coupling structure 292 (FIG. 3) may decouple the first portion 291A from the second portion 291B when the rotation mechanism is applied. Thus, when the rotation mechanism applies rotation force on the second portion 291B to rotate the plunger 240 (FIG. 3), the first portion 291A and the oil based pneumatic cylinder are not affected.

In the FIG. 5 example, the rotation mechanism includes a bearing clutch 294 that spins in one direction but not the other direction. For example, the bearing clutch 294 may spin in the clockwise direction, but not the counterclockwise direction. When a torque in the clockwise direction is applied to a pinion 296, the bearing clutch 294 spins and may drive the plunger 240 to rotate. When a torque in the counterclockwise is applied to the pinion 296, the bearing clutch 294 does not spin, thus the plunger 240 does not rotate. Thus, the plunger 240 rotates in one direction in this example. It is noted that other suitable rotation mechanisms may be used to rotate the plunger 240 in any suitable direction, such as selectively in both a clockwise direction and a counterclockwise direction. In an example, the controller may control a rotation mechanism to rotate in the clockwise direction for certain time, and then control the rotation mechanism to rotate in the counterclockwise direction for certain time. In another example, the controller may determine a direction for each rotation, and then control the rotate mechanism to rotate accordingly.

Referring back to FIG. 3 and FIG. 4, in some example implementations, to assemble the valve 210, the seal 251 may be suitably installed on an intermediate open structure 223 of the first section 221 of the valve housing 220, and the wiper 253 may be installed on the plunger 240. Then, the plunger 240 may be disposed into a first portion of cavity 225 of the first section 221 via the intermediate open structure 223. The first portion of cavity 225 may extend within the first section 221 between the inlet 231 and the intermediate open structure 223, with the first section 221 also including the outlet 232 located on a side of the first section 221 so as to communicate with the first portion of cavity 225.

Further, the second section 222 may then be connected with the first section 221. The second section 222 may include a second portion of cavity 225 communicating with the first portion of cavity 225 near the intermediate open structure 223, so as to form the overall cavity 225. The plunger 240 may be movable within the cavity 225 to variably control a flow of fluid between the inlet 231 and the outlet 232. The first section 221 and the second section 222 may be fastened to one another by one or more fastening features, such as bolts (also referred to herein as stubs) 224 (FIG. 4) and nuts (not shown). In some examples, the bolts and nuts may be made of or comprise graphite, such as the high density graphite mentioned above with a mean particle size less than 200 micron (i.e., henceforth referred to as AR-14 graphite). The bolts and nuts can also be made of other higher strength materials such as carbon fiber composites, silicon carbide, tungsten alloys etc.

Further, the secondary seal 252 may be installed on the back open structure 236 of the second section 222, and a cap structure 229 may be installed over the back open structure 236.

According to some aspects of the disclosure, other suitable sealing techniques may be applied, particularly to a valve comprised of brittle material.

Figure 6:
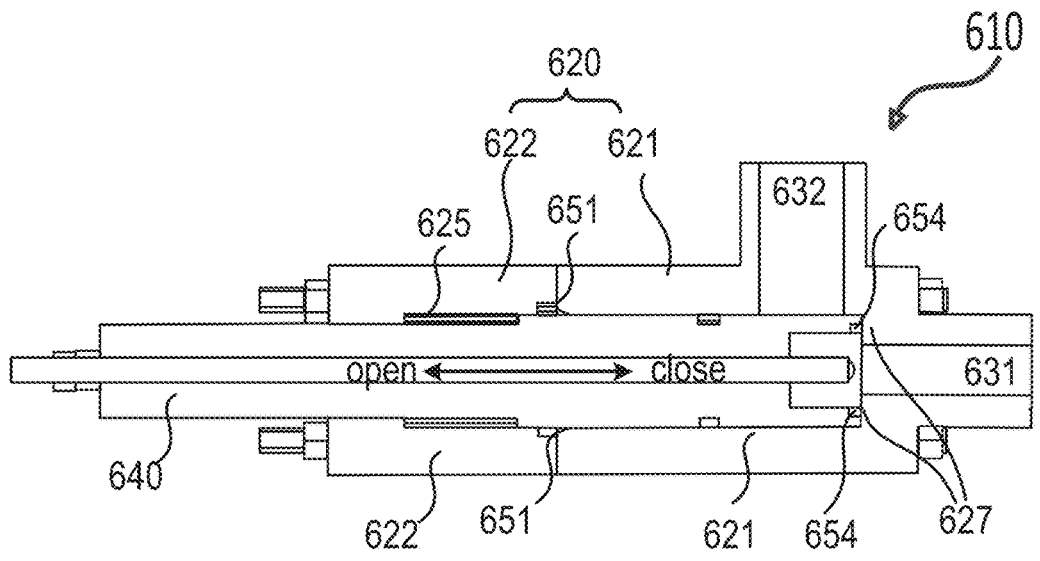
FIG. 6 shows a cross-sectional view of a valve in accordance with some example implementations.

FIG. 6 shows a cross-sectional view of a valve 610 in some example implementations. The valve 610 as shown includes some features similar to those of valve 210 shown in FIG. 3, and may operate and may be installed in a similar manner to valve 210 of FIG. 3. For example, the valve 610 may include a housing 620 with a cavity 625 therein, and a plunger 640 that is movable within the cavity 625. In some examples, the housing 620 may include a first section 621 and a second section 622 for ease of assembly. The housing 620 may define the cavity 625, which may extend in a longitudinal direction of the valve 610, and the plunger 640 may be configured to move in the longitudinal direction of the valve 610 so as to control a fluid flow that communicates with the valve 610. The first section 621 as shown in this example implementation includes two ports, such as a first port 631 (also interchangeably referred to herein as an inlet) and a second port 632 (also interchangeably referred to as an outlet). Cavity 625 extends in the same direction as the direction of extension of one of the two ports, such as the inlet 631, and extends perpendicular to the direction of extension of the other of the two ports, such as the outlet 632 in this example implementation.

According to an aspect of the disclosure, the plunger 640 may be driven to move in the longitudinal direction to open or close the valve 610, and thus to control the fluid flow. In the example implementation of FIG. 6, the plunger 640 may move towards the inlet 631 and into a position that may for example, completely block the outlet 632 and the inlet 631.

Thus, in this position, the valve 610 is closed, no flow path extends between the inlet 631 and the outlet 632, and the fluid flow may thereby be prevented from passing through the valve 610, as shown in FIG. 6. Further, although not shown in the position of the valve 610 shown in FIG. 3, the plunger 640 may be moved distal from the inlet 631 to a position such that the inlet 631 and the outlet 632 are unblocked. Thus, the valve 610 in this position is open, and a flow path extends from the inlet 631 to the outlet 632, such that fluid may flow through the valve 610. It is noted that, in some examples, the plunger 640 may move to a position that may for example, completely unblock the inlet 631 and partially block the outlet 632. Thus, the valve 610 is partially open, and a flow path extends from the inlet 631 to the outlet 632; however, the flow capacity of the fluid when the valve 610 is partially open is lower than the flow capacity when the valve is completely open. In some example implementations, the plunger 640 may be driven to any suitable position that corresponds to a preferred flow capacity.

In the FIG. 6 example, a front seal 654 is shown as located at the head of the plunger 640. In an example implementation, a groove may be formed at the head of the plunger 640, and the front seal 654 may be located within the groove before the plunger 640 is disposed in a cavity of the first section 621. In some example implementations, the front seal 654 may serve as a seal of the pressured fluid. For example, when the plunger 640 moves towards the inlet 631, the front seal 654 may contact the seating portion 627 of the inlet 631 and form good seal therebetween when the front seal 654 is compressed against the seating portion 627.

In some example implementations, the front seal 654 may be formed of compressible material, such as graphite in the form of packing ropes, ferrules, packing rings and the like. In one example implementation, each of the packing rings or packing ropes may be made of or include a flexible and deformable material, such as graphite, graphite flake, flexible graphite, or other suitable flexible/deformable packing materials. In another example, each of the packing rings or packing ropes may be made of or include non-deformable/ non-flexible materials, such as metal, alloy, ceramic, silica, or the like. In another example, each of the packing rings or packing ropes may be made of or include fibrous materials or non-fibrous materials.

It is noted that sealing techniques in FIG. 3 and FIG. 6 maybe combined in implementing a valve design.

FIG. 7 shows a flow chart outlining a process 700 to assemble a valve, such as the valve 210, the valve 610, and the like, as shown in the above examples. The process 700 starts from S701 and proceed to S710.

At S710, a plunger is disposed into a first cavity of a first section of a valve housing of the valve via an intermediate open structure. The first cavity extends in the first section of the valve housing between a first port at the first section of the valve and the intermediate open structure, the first section of the valve housing including a second port of the valve formed on a side of the housing so as to communicate with the first cavity.

At S720, a second section of the valve housing is connected with the first section of the valve housing, a second cavity of the second section thereby joins the first cavity at the intermediate open structure to form an overall cavity within the valve, with the plunger being movable within the cavity to enable selective control a fluid flow between the first port and the second port.

At S730, the first section of the valve housing is fastened to the second section of the valve housing. The plunger, the first section of the valve housing and the second section of the valve housing may be made of or comprise brittle material, such as ceramics, graphite and the like.

In some examples, a compressible sealing material may be installed within a groove at a head surface of the plunger before the disposing the plunger within the cavity.

In some examples, a compressible sealing material may be installed within a groove on a side surface of the plunger.

In some example implementations, a compressible sealing material may be installed between the first section of the valve housing and the second section of the valve housing.

In some example implementations, the compressible sealing material may be in the form of packing ropes, ferrules, packing rings and the like. In one example implementation, each of the packing rings or packing ropes may be made of or include a flexible and deformable material, such as graphite, graphite flake, flexible graphite, or other suitable flexible/deformable packing materials. In another example implementation, each of the packing rings or packing ropes may be made of or include non-deformable/non-flexible materials, such as metal, alloy, ceramic, silica, or the like. In yet another example implementation, each of the packing rings or packing ropes may be made of or include fibrous materials or non-fibrous materials.

Then, the process proceeds to S799 and terminates.

The process 700 may be suitably adapted for particular implementations. For example, some step(s) in the process 700 may be modified and/or omitted. Additional step(s) may be added. Any suitable order of implementation may be used.

FIG. 8 shows a flow chart outlining a process 800 to operate a valve, such as the valve 210, the valve 610, referenced above, and the like. The process 800 starts from S801 and proceed to S810.

At S810, a plunger of a valve is driven to move in a linear motion within a cavity of a valve housing to a position associated with a fluid flow between a first port and a second port. The valve may be made of one or more of ceramics and graphite, with the first port being aligned in direction of extension with the direction of extension of the cavity in a length direction of the valve; the second port is formed on a side of the housing so as to communicate with the cavity.

At S820, the plunger of the valve is driven to move in an angularly rotational motion when the plunger reaches a selected position.

In some examples, the plunger may be driven to angularly rotate to a predefined angle.

In some example implementations, the plunger may be driven by an oil based pneumatic cylinder to move in the linear direction.

Then, the process proceeds to S899 and terminates.

The process 800 may be suitably adapted. One or more step(s) in the process 800 may be modified and/or omitted. Additional step(s) may be added. Any suitable order of implementation may be used.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A valve system, comprising:
a valve comprising:
a valve housing with a valve cavity extending in a length direction of the valve, the valve housing being formed entirely from graphite that remains in a solid state in a temperature range of 1000° C. to 3000° C. and comprising a first port aligned with the valve cavity and a second port that is formed on a side of the valve cavity; and
a plunger being formed entirely from the graphite, movable in the valve cavity of the valve housing, and configured to control a fluid flow between the first port and the second port while the fluid flow is at a temperature of 1900° C.-2400° C.

2. The valve system of claim 1, wherein the plunger is configured to have a linear motion and a rotation motion in the valve cavity relative to the valve housing.

3. The valve system of claim 2, wherein the plunger is configured to rotate a predefined angle relative to the valve housing for the rotation motion.

4. The valve system of claim 1, wherein the plunger comprises a head surface configured to form a sealing structure that closes a flowing path for the fluid flow between the first port and the second port when the head surface of the plunger comes in contact with an interior portion of the first port.

5. The valve system of claim 4, wherein the head surface of the plunger is configured to be a mating surface to the interior portion of the first port.

6. The valve system of claim 4, wherein the plunger comprises a groove at the head surface of the plunger, and wherein the plunger further comprises a compressible sealing material installed over the groove.

7. The valve system of claim 4, wherein the head surface of the plunger comprises a non-mating portion, relative to the interior portion of the first port, such that a portion of the valve cavity remains unblocked when the head surface comes in contact with the interior portion of the first port.

8. The valve system of claim 1, wherein the plunger comprises a groove at a side surface of the plunger, and wherein the plunger further comprises a compressible sealing material installed over the groove.

9. The valve system of claim 1, further comprising a connection structure and an actuator that is coupled to the plunger by the connection structure, wherein the actuator is configured to drive the plunger in the valve cavity, and wherein the actuator comprises at least a material that is different from the graphite.

10. The valve system of claim 9, wherein the actuator comprises an oil-based cylinder configured to drive the plunger in a linear motion.

11. The valve system of claim 10, wherein the actuator comprises a rotation structure configured to drive the plunger in a rotation motion.

12. The valve system of claim 11, wherein the actuator comprises a coupling structure configured to decouple the rotation structure from a shaft for driving the plunger in a linear motion.

13. The valve system of claim 12, wherein:

the shaft comprises a first portion, a second portion, and a shaft coupling structure positioned in between and selectively coupling the first portion and the second portion, the coupling structure couples the first portion and the second portion when the linear motion is applied to the first portion, and the coupling structure decouples the first portion and the second portion when the rotational motion is applied to the second portion.

14. The valve system of claim 1, wherein the graphite is an isostatically-pressed grade graphite with a mean particle size less than 200 micrometers.

15. The valve system of claim 1, wherein the valve is configured to control the fluid flow of molten tin.

16. A valve system, comprising:

a valve comprising:

a valve housing with a valve cavity extending in a length direction of the valve, the valve housing being formed entirely from a carbon-containing material that remains in a solid state in a temperature range of 1000° C. to 3000° C. and comprising a first port aligned with the valve cavity and a second port that is formed on a side of the valve cavity, wherein the valve housing comprises a first section and a second section that are separable and configured to couple in the length direction of the valve with at least a compressible sealing material in between; and a plunger being formed entirely from the carbon-containing material, movable in the valve cavity of the valve housing, and configured to control a fluid flow between the first port and the second port while the fluid flow is at a temperature of 1900° C.-2400° C.

17. A method of operating a valve system comprising a valve with a valve housing and a plunger, the method comprising:

driving the plunger to move in a linear motion within a cavity of the valve housing to a position associated with a fluid flow between a first port and a second port of the valve housing, wherein:

each of the valve housing and the plunger is formed entirely from a carbon-containing material that remains in a solid state in a temperature range of 1000° C. to 3000° C., the first port is aligned with the cavity that extends in a length direction of the valve, and the second port is formed on a side of the cavity; and driving the plunger to move in a rotation motion when the plunger reaches the position associated with the fluid flow between the first port and the second port while the fluid flow is at a temperature of 1900° C.-2400° C.

18. The method of claim 17, wherein the driving the plunger of the valve to move in the rotation motion further comprises driving the plunger to turn a predefined angle by the rotation motion relative to the valve housing.

19. The method of claim 17, wherein the driving the plunger of the valve to move in the linear motion further comprises driving the plunger by an oil-based cylinder to move in the linear motion.

* * * * *